Nov. 19, 1968     E. A. LEVY     3,411,842
MIRROR ASSEMBLY TO BE HELD BETWEEN THE KNEES OF A USER
Filed July 6, 1964
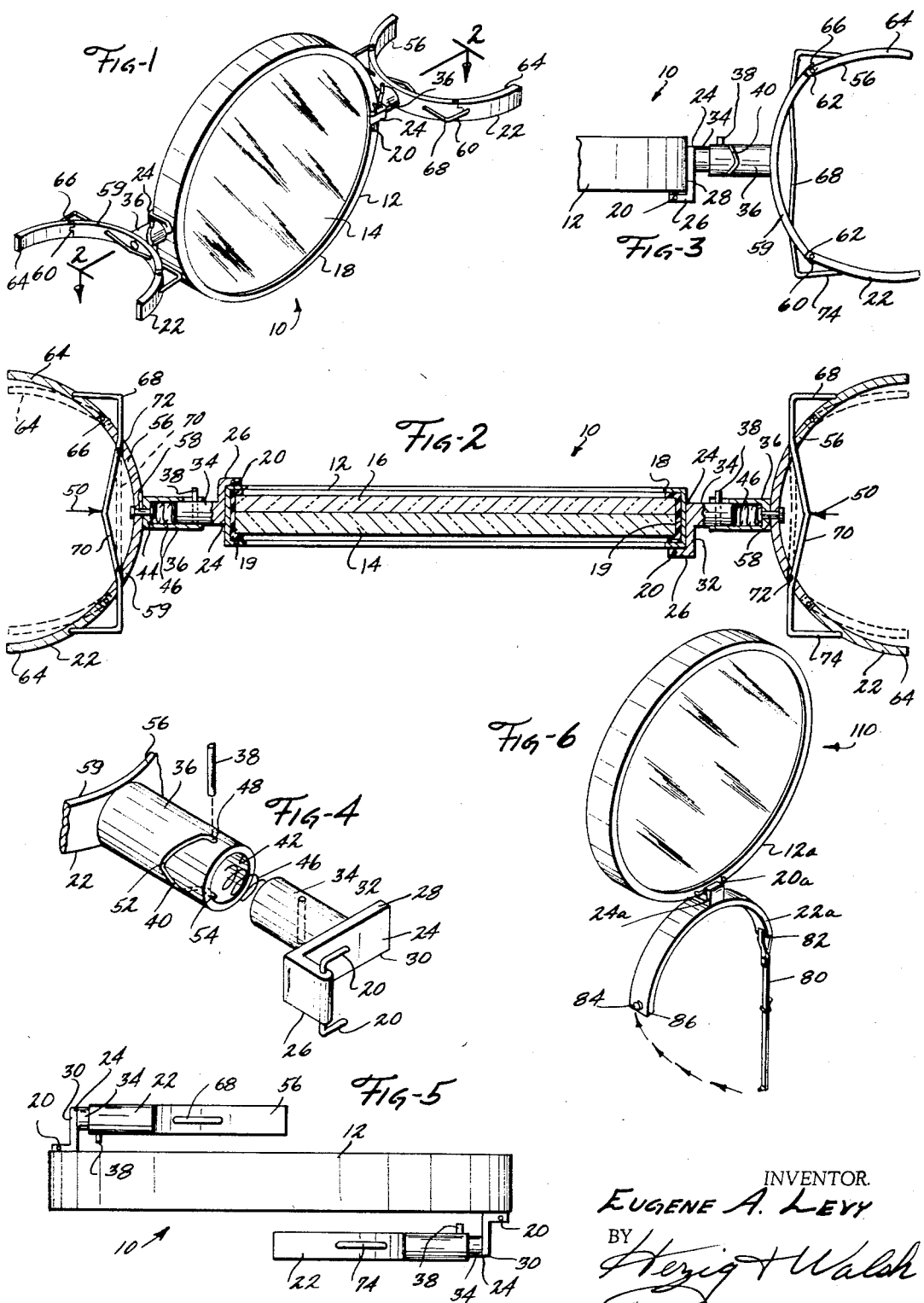
INVENTOR.
EUGENE A. LEVY
BY Herzig & Walsh
ATTORNEYS 3,411,842
MIRROR ASSEMBLY TO BE HELD BETWEEN THE
KNEES OF A USER
Eugene A. Levy, 2429 Lanterman Terrace,
Los Angeles, Calif. 90039
Filed July 6, 1964, Ser. No. 380,205
2 Claims. (Cl. 350—298)

ABSTRACT OF THE DISCLOSURE

The invention provides a mirror assembly adapted to be held between the knees of the user, and positioned with respect to the user's face by pressure exerted by the knees, whereby the mirror is rotated about a horizontal axis to whatever extent is desired. Both hands of the user are thus left free even during adjustment of the mirror as well as in use.

---

This invention relates to new and useful improvements in a mirror construction, and more particularly to a mirror which may be supported by a person using the mirror.

Certain prior art vanity mirrors of the reversible type are available having a first face presenting a normal image and a second face presenting an enlarged image. Such mirrors are often used by men who shave themselves and by ladies who apply their own makeup. While generally satisfactory, such mirrors do have certain disadvantages.

One disadvantage resides in the fact that, under certain conditions, one hand of the person using the mirror must be free to either hold the mirror or to manipulate it during use. This makes the mirror cumbersome to use because in the majority of situations where it is desirable to use the mirror, neither hand of the person using the mirror is free.

Another disadvantage resides in the fact that such mirrors are very difficult for a person to use while traveling. For example, a person riding on an airplane or other conveyance often desires to comb her hair and apply makeup while sitting in her seat. Since both hands are required for performing these duties, it is virtually impossible to use the mirror to its fullest advantage.

Yet another disadvantage resides in the fact that it is difficult to adjust such mirrors to a proper angle to obtain the most efficient use thereof.

In view of the foregoing factors and conditions characteristic of vanity mirrors of the reversible type, it is a primary object of the present invention to provide a new and useful mirror not subject to the disadvantages enumerated above and having a mechanism especially designed for supporting the mirror upon the body of the person using the mirror in such a manner that the mirror may be reversed during use even though both hands of the user are occupied elsewhere.

Another object of the present invention is to provide a mirror of the type described which may be supported between the knees of the user of the mirror.

Yet another object of the present invention is to provide a reversible mirror which may be automatically reversed while being supported between the knees of a person using the mirror by applying pressure to the sides of the mirror.

A further object of the present invention is to provide a mirror which may be strapped to a limb of a user of the mirror.

A still further object of the present invention is to provide a new and useful camming mechanism which will reverse a mirror by a sidewise thrust on the mechanism.

According to a first embodiment of the present invention, a vanity mirror having a first face presenting a normal image and a reverse face presenting an enlarged image is pivotally supported by a pair of U-shaped clamps which are adapted to be supported between the legs of a user of the mirror. When not in use, the clamps can be folded over the mirror with one clamp adjacent one face of the mirror and the other clamp adjacent the other face to form a compact assembly which will occupy a minimum amount of space.

A camming mechanism is connected to each clamp and to the mirror in such a manner that a sidewise force, such as may be exerted by bringing the legs of the user of the mirror together, will actuate the camming mechanism to rotate the mirror thereby bringing its reverse face into view.

According to a second embodiment of the present invention, a reversible motor is mounted on a single bracket which includes strap means for strapping the mirror to a leg or an arm of the user of the device.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a perspective view of a mirror constituting a first embodiment of the present invention;

FIGURE 2 is a cross-sectional view, on an enlarged scale, taken along line 2—2 of FIGURE 1, showing its clamps in an open position in solid lines and in a clamped position in broken lines;

FIGURE 3 is a partial, plan view, on an enlarged scale, of the mirror of FIGURE 1, showing one of its clamps in a clamped position;

FIGURE 4 is a perspective, exploded view, on an enlarged scale, of the camming mechanism employed in the mirror of FIGURE 1;

FIGURE 5 is a plan view, on an enlarged scale, of the mirror of FIGURE 1 showing its clamps in a folded position; and FIGURE 6 is a perspective view of a mirror constituting a second embodiment of the present invention.

Referring again to the drawings and particularly to FIGURES 1–5, a mirror construction constituting a first embodiment of the present invention, generally designated 10, includes a vanity mirror 12 having a front face 14 and a rear face 16. The faces 14 and 16 are clamped together in back-to-back relationship by a band 18 which encompasses the faces. A suitable resilient material 19 may be inserted between the peripheral edges of the faces and the band 18 to protect the peripheral edges.

A hook 20 is provided on the band 18 adjacent each face to pivotally support a U-shaped clamp 22. Each clamp 22 includes an L-shaped bracket 24 having a first leg 26 which is pivotally connected to an associated hook 20 and a second leg 28 having an inside face 30 which abuts the band 18 when the bracket 24 is swung about the hook 20 to a first position, as shown in FIGURE 2. Each second leg 28 also has a rear face 32 to which a plunger 34 is rigidly affixed. Each plunger 34 slidably engages a hollow, sustantially cylindrical camming mechanism 36 and carries an upstanding pin 38 which engages a cam surface 40 provided in the encompassing side wall 42 of an associated camming mechanism 36. Each camming mechanism 36 includes a closed bottom wall 44 upon which one end of a compression spring 46 is seated. The other end of each spring 46 bears against an associated plunger 34 to bias its pin 38 into engagement with one end 48 of cam surface 40 when the mirror 12 is in its FIGURE 1 position. When a sufficient force is exerted against the clamps 22 in the direction of arrows 50 (FIGURE 2) to overcome the bias of the springs 46, the pins 38 travel along their cam surfaces 40 causing the mirror 12 to rotate until the pins 38 reach the root portions 52 of the cam surfaces 40 whereupon the force on clamps 22 can be released so that the springs 36 will move the plungers 34 in the opposite direction causing the pins 38 to continue traveling along cam surfaces 40 until they seat at the other ends 54 of the cam surfaces. The mirror 12 will then be revolved 180° bringing its rear face 16 to the FIGURE 1 position.

Each clamp 22 also includes a U-shaped portion 56 which is pivotally connected to an associated camming mechanism 36 by a pin 58. The pins 58 engage their associated bottom walls 44 and intermediate portions 59 of the U-shaped portions 56 with sufficient friction to maintain the mirror 12 in any desired degree of tilt when it is being used. When it is desired to store the mirror 12 in a minimum of space, the clamps 22 may be swung about their associated hooks 20 to the position shown in FIGURE 5 where one clamp is positioned superjacent the mirror 12 and the other clamp is positioned subjacent the mirror 12. The U-shaped portions 56 of clamp 22 may then be pivoted about pins 58 so that the U-shaped portions 56 will lie in a horizontal plane, as shown in FIGURE 5. Each intermediate portion 59 includes a tang 60 at each end to which a bifurcated portion 62 of a swingable member 64 is pivotally connected by a pin 66. The swingable members 64 are normally maintained in the solid line positions shown in FIGURE 2 by springs 68 and may be swung to the dotted line positions shown in FIGURE 2 by slight pressure exerted upon the springs 68 in the direction of arrows 50 to straighten their bowed portions 70 to the dotted line position shown in FIGURE 2. Each bight portion 70 is slidably mounted in apertures 72 provided in an associated intermediate portion 59. Each spring 68 includes ends 74 which extend from a bight portion 70 at right angles thereto and which engage a swingable member 64. Thus, when a bight portion 70 is moved in the direction of arrow 50 to the dotted line position, the ends 74 are drawn toward each other to swing the associated swingable member 64 to the dotted line position. This firmly clamps the mirror 12 between the knees of a user thereof. The mirror 12 may then be tilted about the pins 58 to correctly align one of the faces, such as the face 14, with respect to the user of the device. Should the user wish to bring the face 16 into position, additional pressure is applied in the direction of arrows 50 sufficiently to overcome the bias of springs 46 and cause the pins 38 to travel along their cam faces 40 until the mirror 12 has been rotated.

Referring now to FIGURE 6, a second embodiment of the present invention, generally designated 110, may employ a mirror 12a having a hook 20a to which an L-shaped bracket 24a may be pivotally connected. A U-shaped clamp 22a is affixed to the bracket 24a and includes an adjustable strap 80 which is attached to one end 82 of the clamp 22a. The strap 80 is engageable with a protuberance 84 mounted on the other end 86 of the clamp 22a. The strap 80 may be employed to affix the clamp 22a to a leg of the user of the mirror 110 or, alternatively, the mirror 110 can be attached to the arm of a user of the device in such a position that the mirror 110 is automatically positioned near the face of a user of the device when his arm is raised to apply a razor or other device to his face.

While the particular mirrors herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. In combination with a mirror having a front face and a rear face, means for supporting said mirror between the knees of a user of the device comprising:
   a pair of knee-engaging clamps affixed to said mirror, said clamps being adapted to engage the limbs of a user of the mirror adjacent said user's knees to support said mirror between said knees;
   and pivotal connecting means for pivotally connecting said clamps to said mirror,
   said pivotal connecting means including means for rotating said mirror in response to pressure applied to the clamps when said knees are moved together.

2. In combination with a mirror having a front face and a rear face, means for supporting said mirror between the legs of a user of the mirror adjacent said user's knees comprising:
   a band encompassing said mirror;
   a pair of L-shaped brackets swingably connected to diametric edges of said band;
   a plunger member rigidly affixed to each of said L-shaped brackets;
   a pin forming a protuberance on each of said plungers;
   a hollow-cylindrical cam member encompassing each of said plungers in sliding engagement therewith;
   a U-shaped cam face provided in the side wall of each of said cam members, said cam surfaces having a root portion and end portions, said pin engaging said cam surface;
   a compression spring mounted in each of said cam members for engaging its associated plunger, each of said springs biasing its plunger in such a manner that its pin seats against one of said ends of an associated surface; and
   a U-shaped clamp pivotally connected to each of said cam members, each of said clamps being adapted to engage a leg of said user adjacent said knees, whereby said mirror is positioned between said knees with one of said faces being aligned in the line of vision of said user, the other of said faces being brought into the line of vision of said user by bringing said knees together with sufficient pressure to overcome the bias of said springs whereby said pins rotate said mirror as said pins follow the paths defined by said cam surfaces to said roots whereupon said pressure may be released and said springs bias said pins into engagement with the other ends of said cam surfaces whereby said mirror is rotated 180°.

References Cited

UNITED STATES PATENTS

| | | | |
|---|---|---|---|
| 574,877 | 1/1897 | Blomiley | 350—298 |
| 1,389,053 | 8/1921 | King | 350—298 |
| 2,352,819 | 7/1944 | Winslow | 350—298 |
| 2,627,785 | 2/1953 | Bartkowski | 350—298 |
| 2,979,990 | 4/1961 | Alexander | 350—298 |

JEWELL H. PEDERSEN, *Primary Examiner.*

O. B. CHEW, *Assistant Examiner.*